United States Patent [19]

Fritsch

[11] Patent Number: 4,616,284
[45] Date of Patent: Oct. 7, 1986

[54] CLEANING CASSETTE WITH MEANS FOR INTERMITTENTLY WETTING A CLEANING TAPE

[75] Inventor: Joseph F. Fritsch, Dunmore East, Ireland

[73] Assignee: Ryan Plastics Ireland Limited, Waterford, Ireland

[21] Appl. No.: 674,057

[22] Filed: Nov. 21, 1984

[30] Foreign Application Priority Data

Nov. 21, 1983 [IE] Ireland .............................. 2721/83

[51] Int. Cl.$^4$ ........................ G11B 5/10; G11B 5/127; G11B 5/41
[52] U.S. Cl. ............................ 360/128; 15/210 R; 15/DIG. 12; 15/DIG. 13
[58] Field of Search ............. 360/128, 137; 15/210 R, 15/DIG. 12, DIG. 13, DIG. 14, DIG. 15

[56] References Cited

U.S. PATENT DOCUMENTS

| | | | |
|---|---|---|---|
| 4,442,468 | 4/1984 | d'Alayer de Costemore d'Arc | 360/128 |
| 4,458,281 | 7/1984 | Kara | 360/128 |
| 4,490,761 | 12/1984 | Wolynski et al. | 360/128 |

FOREIGN PATENT DOCUMENTS

| | | |
|---|---|---|
| 0028708 | 10/1980 | European Pat. Off. . |
| 0123124 | 3/1984 | European Pat. Off. . |
| 3212730 | 9/1983 | Fed. Rep. of Germany . |
| 894385 | 1/1983 | France . |
| 58-114324 | 7/1983 | Japan . |
| 2127203 | 4/1984 | United Kingdom . |

*Primary Examiner*—Robert S. Tupper
*Assistant Examiner*—Melissa J. Koval
*Attorney, Agent, or Firm*—Hughes & Cassidy

[57] ABSTRACT

A mechanism for intermittently wetting a cleaning tape contained within a tape cassette housing is located within the housing at a position along the tape path prior to the tape exit in the direction of forward motion of the tape. The mechanism comprises a star wheel rotatably mounted adjacent the inside surface of the cleaning tape whose arms are driven by friction with the tape to rotate the star wheel, and a lever pivotted adjacent the same surface of the tape as the star wheel, the lever being intermittently deflected in a first direction of rotation by engagement with successive arms of the star wheel as the star wheel rotates during forward motion of the tape. A wetting member is mounted adjacent the outside surface of the tape opposite the lever, and each arm of the star wheel during its engagement with the lever effects sufficient deflection of the lever in the first direction of rotation that the lever bears against and deflects the tape outwardly to such an extent that the outer surface of the tape is brought to bear against the wetting member. The lever has sufficient resilience to permit each arm to disengage the lever during further rotation of the star wheel after the tape has been brought to bear on the wetting member, whereby the lever returns in the opposite direction of rotation for re-engagement of the first portion by the next arm.

5 Claims, 1 Drawing Figure

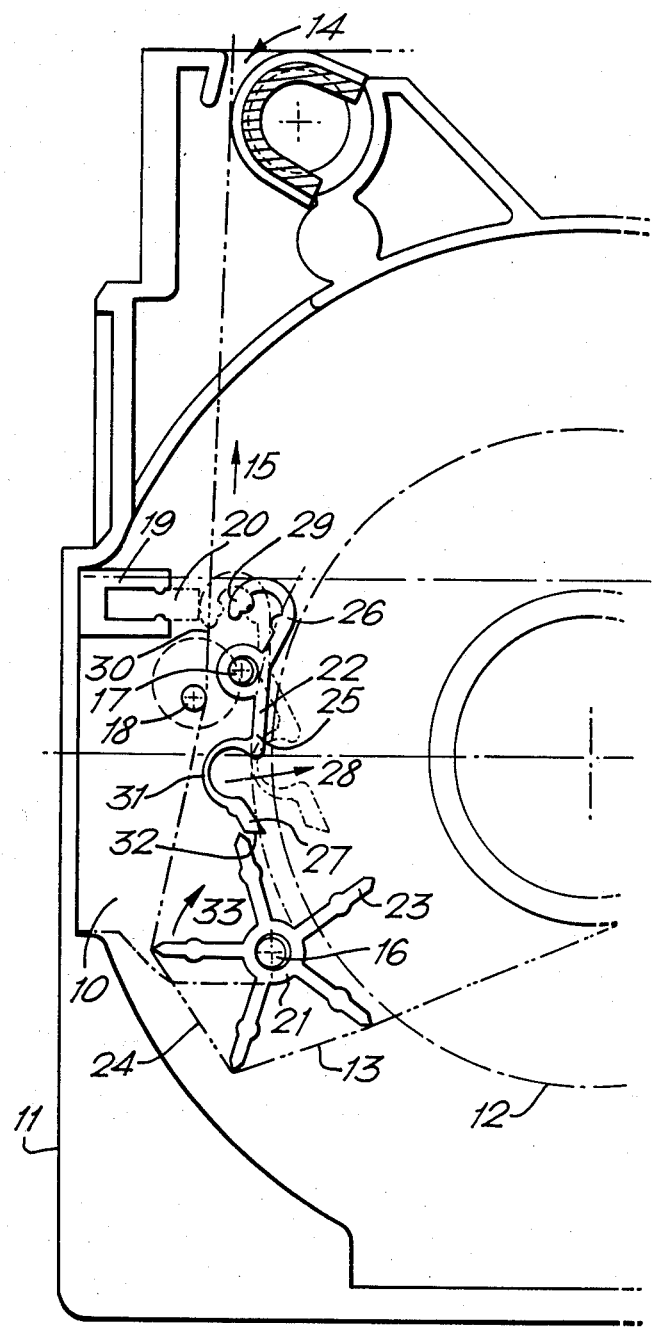

CLEANING CASSETTE WITH MEANS FOR INTERMITTENTLY WETTING A CLEANING TAPE

This invention relates to a mechanism for intermittently wetting a cleaning tape contained within a tape cassette housing, such as a video cassette housing.

Cleaning apparatus for cleaning the entire tape path of a video cassette record/replay unit is known, such apparatus comprising a cassette housing corresponding to the standard of the particular cassette unit involved (e.g. VHS, Beta, Philip's 2000) so that it can be inserted into the unit in substitution for a cassette proper, but containing instead a special tape which has a certain degree of surface roughness to clean the parts of the unit past which it travels. It is also known to provide intermittent wetting of the cleaning tape in a cassette as aforesaid, one example of such wetting being to provide a rotatably mounted reservoir of cleaning fluid having friction elements around its circumference so that in use it is rotated by the cleaning tape. The reservoir also has a felt pad on its surface which is kept moist with cleaning fluid from inside the reservoir and contacts the cleaning tape once per revolution of the reservoir.

One disadvantage of this known wetting mechanism is that the frictional characteristics of the rotating felt pad, which may project outwardly of the periphery of the reservoir, are not the same as the frictional characteristics of the reservoir itself which is of plastics material. This can result in an erratic motion of the wetting mechanism, which is prone to stop with the felt pad in contact with the cleaning tape leading to wetting of large areas of the tape. These excessively wetted areas of the tape may in turn adhere to the video drum through surface tension effects, which may cause the tape tension sensors within the video unit to stop the tape drive mechanism and prematurely halt the cleaning cycle.

Furthermore, the reservoir of the known mechanism is spring biased against the tape and thus, even if such erratic motion does not occur, the reservoir nevertheless applies an excessive continuous force on the cleaning tape, placing an unnecessary strain on the drive mechanism of the video unit.

Another disadvantage of the known intermittent wetting mechanism is that the mechanism wets the entire length of the cleaning tape, not only the cleaning tape proper but also any "shut-off" portions at the ends of the tape which are sensed by the unit to automatically stop the tape drive at the end of the tape. This is particularly disadvantageous in relation to cleaning cassettes for the Philip's 2000 format as this is likely to interfere with the proper detection of the shut-off portions.

It is therefore an object of the invention to provide an improved intermittent wetting mechanism in which the above disadvantages are overcome or at least reduced, and which at least in the case of the Philip's 2000 format is less likely to wet the "shut-off" portions of the tape.

Accordingly, the present invention provides a mechanism for intermittently wetting a cleaning tape contained within a tape cassette housing, the mechanism being located within the housing at a position along the tape path prior to the tape exit in the direction of forward motion of the tape, the mechanism comprising a star wheel rotatably mounted adjacent the inside surface of the cleaning tape and whose arms are driven by friction with the tape to rotate the star wheel, a wetting member mounted adjacent the outside surface of the tape, and means adapted for intermittent deflection by successive arms of the star wheel as the star wheel rotates during forward motion of the tape, said means upon each such deflection by the star wheel being adapted to bear against and deflect the tape outwardly to such an extent that the outer surface of the tape is brought temporarily into contact with the wetting member. Preferably the said means adapted for intermittent deflection comprises a lever pivotted adjacent the same surface of the tape as the star wheel, the lever having first and second portions respectively on opposite sides of the pivot and being intermittently deflected in a first direction of rotation by engagement of the first portion of the lever with successive arms of the star wheel as the star wheel rotates during forward motion of the tape, each arm of the star wheel during its engagement with the first portion of the lever effecting sufficient deflection of the lever in the first direction of rotation that the second portion of the lever causes deflection of the tape outwardly to such an extent that the outer surface of the tape is brought to bear against the wetting member, at least part of the mechanism being sufficiently resilient to permit each arm to disengage the first portion of the lever during further rotation of the star wheel after the tape has been brought to bear on the wetting member, the lever returning in the opposite direction of rotation to the first direction each time an arm disengages the first portion for re-engagement of the first portion by the next arm.

A major advantage of the invention is that the starwheel is not biassed against the tape as in the prior art and therefore the overall force exerted on the tape and thus on the drive mechanism is significantly reduced. Furthermore, by separating the wetting member itself from the part of the mechanism (the starwheel) which is frictionally rotated by the tape, the mechanism may be designed to bring the tape into contact with the wetting member for only a very short period of time during each engagement of the starwheel with the lever. This means that excessive wetting of the tape is unlikely to occur, and the additional friction exerted on the tape during wetting is only momentary and does not place undue strain on the drive mechanism of the video unit.

Preferably, the lever is provided with the desired resilience by means of a resilient generally U-shaped bend in the first portion of the lever between the pivot and the region which engages the arms of the star wheel. The base of the U-shaped bend faces the inside surface of the tape and contact of the base of the U-shaped bend with the tape prevents the lever from being deflected back beyond a point at which it can be engaged by the next arm. The U-shaped bend also provides sufficient resilience deformation of the lever to permit the arms of the star wheel to flick past the first portion of the lever during fast rewind of the tape in the reverse direction.

Preferably the star wheel and lever are formed each as a one-piece moulding of acetyl co-polymer, this having the desired resilient properties.

It is advantageous if at least one (and perferably both) of the star wheel and lever is loosely mounted with a significant degree of tolerance to avoid the two jamming together if the tape should be stopped during its forward motion at a point where the pressure exerted upon the first portion of the lever by one of the star wheel arms is at or near its maximum. In this case, upon relaxation of tape tension which occurs when the tape is stopped, the tolerance will permit the arm and lever to move apart somewhat to relieve the pressure.

Although not limited thereto, the invention is particularly advantageous when used in connection with a cleaning cassette for the Philip's 2000 format. As mentioned above, it is undesirable to wet the shut-off portion of the cleaning tape for this type of cassette, and this is avoided in the present invention by taking advantage of the fact that the shut-off portion in Philip's 2000 cassettes is very smooth compared to the cleaning tape proper. Thus when the shut-off portion reaches the star wheel it will initially rotate the latter into contact with the first portion of the lever, and thus the second portion of the lever into contact with the tape, but will not thereafter provide sufficient friction against the arms of the lever to overcome the tension in the tape which acts in opposition to the second portion of the lever. Thus the shut-off portion of the tape will simply slide past the star wheel arms and will not be brought to bear upon the wetting member.

An embodiment of the invention will now be described with reference to the accompanying drawing which is a plan view of a mechanism according to the present invention inserted in one side of a cleaning cassette.

The intermittent wetting mechanism illustrated is mounted on a base member 10 which is inserted in one side of a tape cassette housing 11 adjacent the supply spool 12 for the cleaning tape. In particular, the mechanism is located at a position along the path of the cleaning tape 13 which is prior to the point of exit 14 of the tape 13 from the housing 11 in the direction of forward motion of the tape, indicated by the arrow 15.

The base member 10 includes upstanding posts 16, 17 and 18, and a holder 19 for an absorbant felt pad 20 which, in use, is impregnated with a cleaning fluid through a suitable aperture in the housing. A star wheel 21 is freely rotatably mounted on the post 16, and a lever 22 is freely pivotally mounted on the post 17, both the star wheel 21 and lever 22 being loosely mounted on their respective posts 16 and 17 with a sufficient degree of lateral tolerance to prevent the possibility of their jamming together as hereinbefore discussed.

The path of the cleaning tape 13 is around the outside of the star wheel 21 and lever 22, and between the latter and the pad 20, the post 18 serving as a tape guide which keeps the tape 13 out of contact with the pad 20 except when pressed into contact therewith by the lever 22 as will be described. The base member 10, including the posts 16 to 18 and the holder 19, is a one-piece moulding of styrene. The star wheel 21 and the lever 22 are of acetyl copolymer.

The star wheel 21 has five equi-angularly spaced arms 23 which engage the inside surface 24 of the tape 13, the arms 23 being driven by friction with the tape 13 to cause rotation of the star wheel 21 in the direction indicated by the arrow 33 during forward motion 15 of the tape. In the Philip's 2000 format the cleaning tape 13 comprises a material known as LAMTECH, produced by the Gortex Corporation, which provides a high degree of friction with the arms 23 of the star wheel 21 for rotation of the latter as described above.

The lever 22 comprises first and second portions 25 and 26 respectively on opposite sides of the pivot post 17, the first portion 25 having a wedge-shaped end 27 which is engaged by successive arms 23 of the star wheel 21 as the latter rotates in the direction 33. During each engagement of the end 27 by an arm 23 the lever 22 is deflected in the direction of rotation indicated by the arrow 28 so that the head 29 of the second portion 26 of the lever is brought to bear against the inside surface 24 of the tape 13, the degree of deflection of the lever 22 by each arm 23 being such as to cause the head 29 of the second portion 26 of the lever 22 to deflect the tape 13 outwards from its normal path shown in the figure to a position where the outside surface 30 of the tape bears against the felt pad 20 and is thereby wetted. This position of the lever 22 is shown in dot-dashed outline in the figure.

The first portion 25 of the lever 22 includes a U-shaped bend 31 between the pivot post 17 and the wedge-shaped end 27 engaged by the arms of the star wheel, this providing the lever 22 with a degree of resilience by virtue of the acetyl co-polymer plastics material from which the lever is moulded. This resilience permits each arm 23 to disengage from the first portion 25 of the lever, by further rotation of the star wheel 21 after the outside surface 30 of the tape has been brought to bear on the pad 20, by progressively compressing the U-shaped bend 31 and sliding along the sloped end-surface 32 of the wedge-shaped end 27. When the arm 23 finally disengages the surface 32 the potential energy stored in the compressed bend 31 causes the lever 22 to spring back in the opposite direction of rotation to the arrow 28 in readiness for engagement with the next arm 23. The geometrical design of the mechanism is such that during each engagement of the lever 22 with a respective starwheel arm 23 the outside surface 30 of the tape 13 is brought to bear on the pad 20 for a period of time which is short compared to the time period between successive wettings, so that the tape tension is not significantly increased thereby and excessive cleaning fluid is not applied to the tape.

The base of the U-shaped bend 31 faces the inside surface 24 of the tape 13, and, during the return movement of the lever 22 after disengagement with an arm 23, contact of the base of the U-shaped bend 31 with the inside surface 24 of the tape ensures that the lever 22 is not deflected back beyond a point at which the next arm 23 can engage the end 27 of the lever. However, if desired a fixed stop carried by the base 10 could be used for this purpose.

As mentioned before, the "shut-off" portion of the cleaning tape for the Philip's 2000 format is very smooth, and when this reaches the star wheel arms 23 the friction between the latter and the shut-off portion of the tape will not be sufficient to rotate the star wheel 21 to an extent sufficient to bring the head 29 of the lever 22 against the pad 20. Thus, although the star wheel 21 will be rotated into contact with the end 27 of the lever 22, and the head 29 of the lever will be brought against the inside surface 24 of the tape, the combination of tape tension, which acts in opposition to the head 29, together with the residual friction in the star wheel and lever mounts, will prevent any significant further movement of the head 29 towards the pad 20.

During fast rewind of the cleaning tape 13, the star wheel 21 will be driven in the direction of rotation opposite to the direction indicated by the arrow 33. In this case the arms 23 will flick rapidly past the end 27 of the lever, the head 29 of the lever 22 being maintained out of contact with the tape 13. As before, the base of the U-shaped bend 31, or a fixed stop, prevents the lever 22 being rotated back beyond a point at which, upon a subsequent resumption of forward tape motion 15, the arms 23 can engage the wedge-shaped end 27. The flicking of the arms 23 past the end 27 of the lever 22 during fast rewind is facilitated by the resilience of the U-shaped bend 31.

What is claimed is:

1. A mechanism for intermittently wetting a cleaning tape contained within a tape cassette housing, the mechanism being located within the housing at a position along the tape path prior to the tape exit in the direction of forward motion of the tape, the mechanism comprising a star wheel rotatably mounted adjacent the inside surface of the cleaning tape and whose arms are driven by friction with the tape to rotate the star wheel, a wetting member mounted adjacent the outside surface of the tape, and means adapted for intermittent deflection by successive arms of the star wheel as the star wheel rotates during forward motion of the tape, said means upon each such deflection by the star wheel being adapted to bear against and deflect the tape outwardly to such an extent that the outer surface of the tape is brought temporarily into contact with the wetting member.

2. A mechanism according to claim 1, in which the said means adapted for intermittent deflection comprises a lever pivotted adjacent the same surface of the tape as the star wheel, the lever having first and second portions respectively on opposite sides of the pivot and being intermittently deflected in a first direction of rotation by engagement of the first portion of the lever with successive arms of the star wheel as the star wheel rotates during forward motion of the tape, each arm of the star wheel during its engagement with the first portion of the lever effecting sufficient deflection of the lever in the first direction of rotation that the second portion of the lever causes deflection of the tape outwardly to such an extent that the outer surface of the tape is brought to bear against the wetting member, at least part of the mechanism being sufficiently resilient to permit each arm to disengage the first portion of the lever during further rotation of the star wheel after the tape has been brought to bear on the wetting member, the lever returning in the opposite direction of rotation to the first direction each time an arm disengages the first portion for re-engagement of the first portion by the next arm.

3. A mechanism according to claim 2, in which the resilience of the mechanism is provided by a resilient generally U-shaped bend in the first portion of the lever between the pivot and the region which engages the arms of the star wheel.

4. A mechanism according to claim 3, wherein the base of the U-shaped bend faces the inside surface of the tape and, by contact with the tape, prevents the lever from being deflected in the said opposite direction of rotation beyond a point at which it can be engaged by the next arm.

5. A mechanism according to any preceding claim, wherein at least one of the star wheel and lever is loosely mounted with a significant degree of tolerance.

* * * * *